INVENTOR.
ROBERT R. STEIN
BY
Morgan, Finnegan, Durham & Pine
ATTORNEYS

May 31, 1966

R. R. STEIN 3,253,552

TROLLEY SYSTEMS

Filed May 26, 1964

INVENTOR.
ROBERT R. STEIN

BY Morgan, Finnegan, Durham & Pine
ATTORNEYS

May 31, 1966  R. R. STEIN  3,253,552
TROLLEY SYSTEMS
Filed May 26, 1964  4 Sheets-Sheet 3
FIG. 4
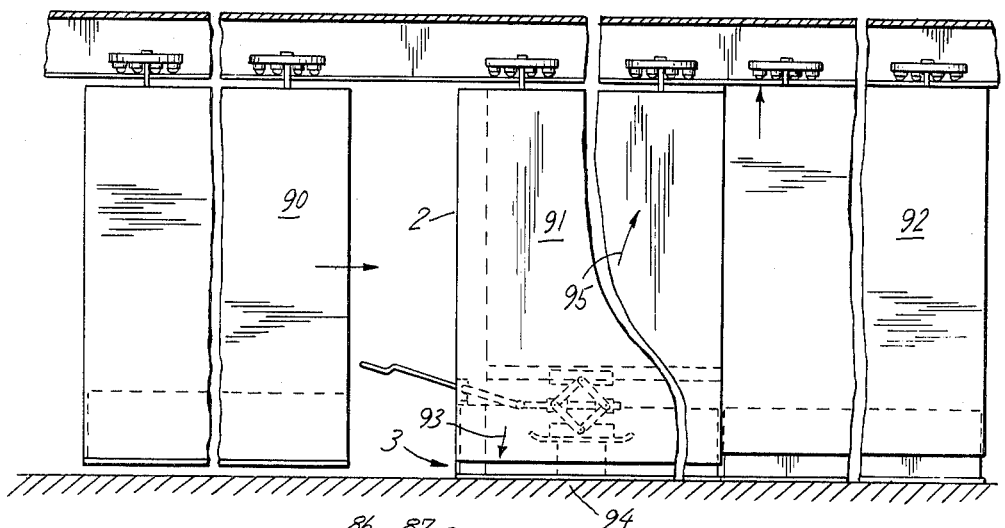
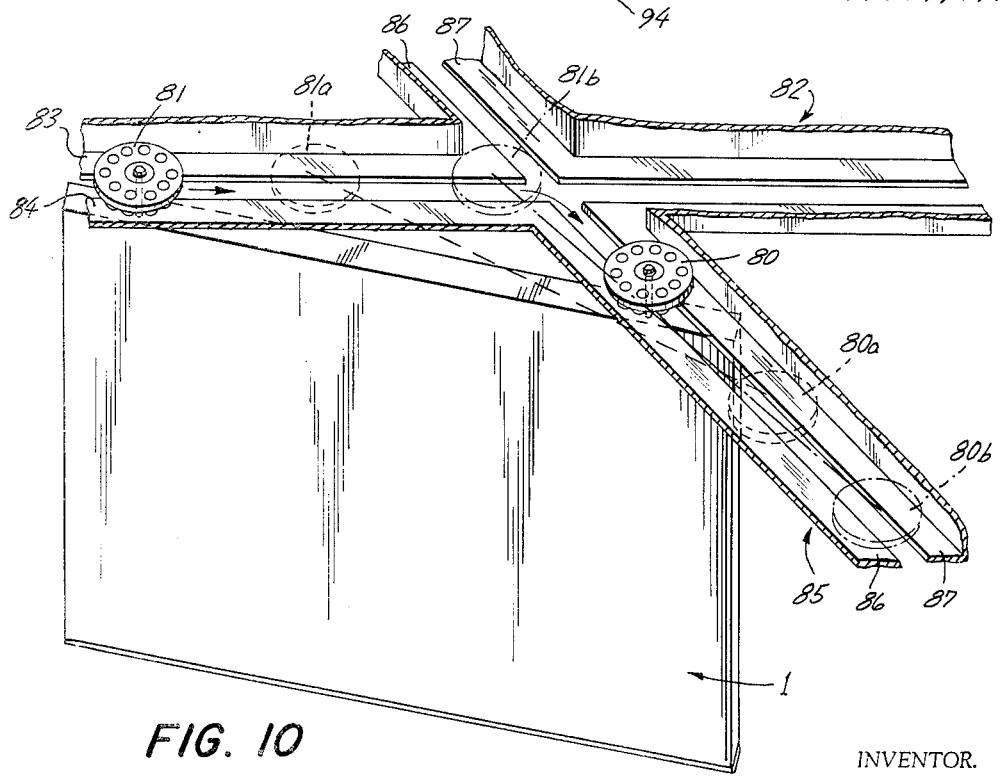
FIG. 10
INVENTOR.
ROBERT R. STEIN
BY
Morgan, Finnegan, Durham & Pine
ATTORNEYS May 31, 1966 R. R. STEIN 3,253,552
TROLLEY SYSTEMS
Filed May 26, 1964 4 Sheets-Sheet 4

INVENTOR.
ROBERT R. STEIN
BY
Morgan, Finnegan, Durham & Pine
ATTORNEYS

United States Patent Office

3,253,552
Patented May 31, 1966

3,253,552
TROLLEY SYSTEMS
Robert R. Stein, Mamaroneck, N.Y., assignor to Industrial Acoustics Company, Inc., a body corporate of New York
Filed May 26, 1964, Ser. No. 370,210
4 Claims. (Cl. 104—94)

This invention relates to trolleys systems which cooperate with overhead tracks and support a movable load, and while not limited thereto, also relates to movable wall systems including trolleys which cooperate with an overhead ceiling track.

In the past, a large number of systems have been designed, usually in connection with assembly line conveyer systems, where various articles can be moved about while suspended from trolleys which cooperate with an overhead track. In most installations the desired path for the movable article is known and the necessary mobility can be achieved with a simple roller trolley system. Where the desired path is other than a straight line, gradually curved track sections are usually employed. In cases where alternative paths are required, it has been the usual practice to employ a mechanical switching system located at the intersections of the multiple paths, these mechanical switching systems being of the type which either substitute one track section for an alternate track section or of the type which transfer the trolley to an alternate track system.

An object of this invention is to provide a trolley system capable of providing an unlimited number of paths without requiring any mechanical switching apparatus.

Another object is to provide a trolley system which eliminates the need for the relatively expensive gradually curved track sections.

Another object is to provide a trolley system which can cooperate with an overhead track system including intersections which can be, for example, cross-shaped, T-shaped, Y-shaped and the like.

Another object is to provide a relatively simple and inexpensive trolley system which is exceptionally mobile and is capable of supporting substantial weight.

Another object is to provide a trolley system particularly well adapted to support movable wall sections from a suitable ceiling track.

Another object is to provide a movable wall section which can be supported from an overhead trolley system and which can easily be placed into position and properly aligned with adjacent wall sections.

The manner in which the foregoing and other objects are attained in accordance with this invention is described more fully in the following detailed specification which describes several illustrative embodiments in detail. The drawings form part of this specification wherein:

FIG. 4 is a side elevation view illustrating the manner in which the wall panels are placed in position;

FIG. 10 is a perspective view illustrating the manner in which the trolley system negotiates a right angle turn.

The trolley system in accordance with this invention cooperates with a relatively simple overhead track including parallel spaced-apart supporting surfaces and which may comprise cross-shaped intersections, T-shaped intersections and the like. The trolley includes a horizontal bearing plate having a plurality of spherical bearings rotatably secured thereto and adapted to support the bearing plate upon the support members. The movable load is suspended from the center of the bearing plate by means of a suitable swivel connection.

The trolley structure is such that it is capable of supporting extremely heavy loads since the load is distributed over a relatively large area and a large number of bearing members. As the trolley moves along the track, the spherical bearings rotate about an infinite number of different axes thereby minimizing wear of the trolley structure. Since the horizontal bearing plate is supported on spherical bearings, the trolley is completely mobile and can travel along virtually any desired path including paths having abrupt changes in direction. More specifically, the trolley system can easily make right angled turns such as those which appear at cross-shaped or T-shaped intersections.

Movable wall panels, preferably of the retractable type, are conveniently suspended from a spaced-apart pair of these trolleys. These movable wall panels can easily be guided to a desired location and thereafter extended to engage the floor and the ceiling. The trolley system is designed so that a wall panel can freely move upwardly to engage the ceiling so that the weight of the installed wall panel is no longer supported by the trolleys. The mechanism for extending the wall panel is located off center i.e., closer to one vertical edge of the panel than to the other. The operator installing a wall panel can manually force the lower portion of the wall panel into position, for example, against an adjacent wall panel. Thereafter, if the wall section is extended, the off-center mechanism tends to tilt the upper portion of the wall panel toward the adjacent wall panel to thus assure proper positioning. The trolley system is designed to permit this tilting motion.

Figure 1:
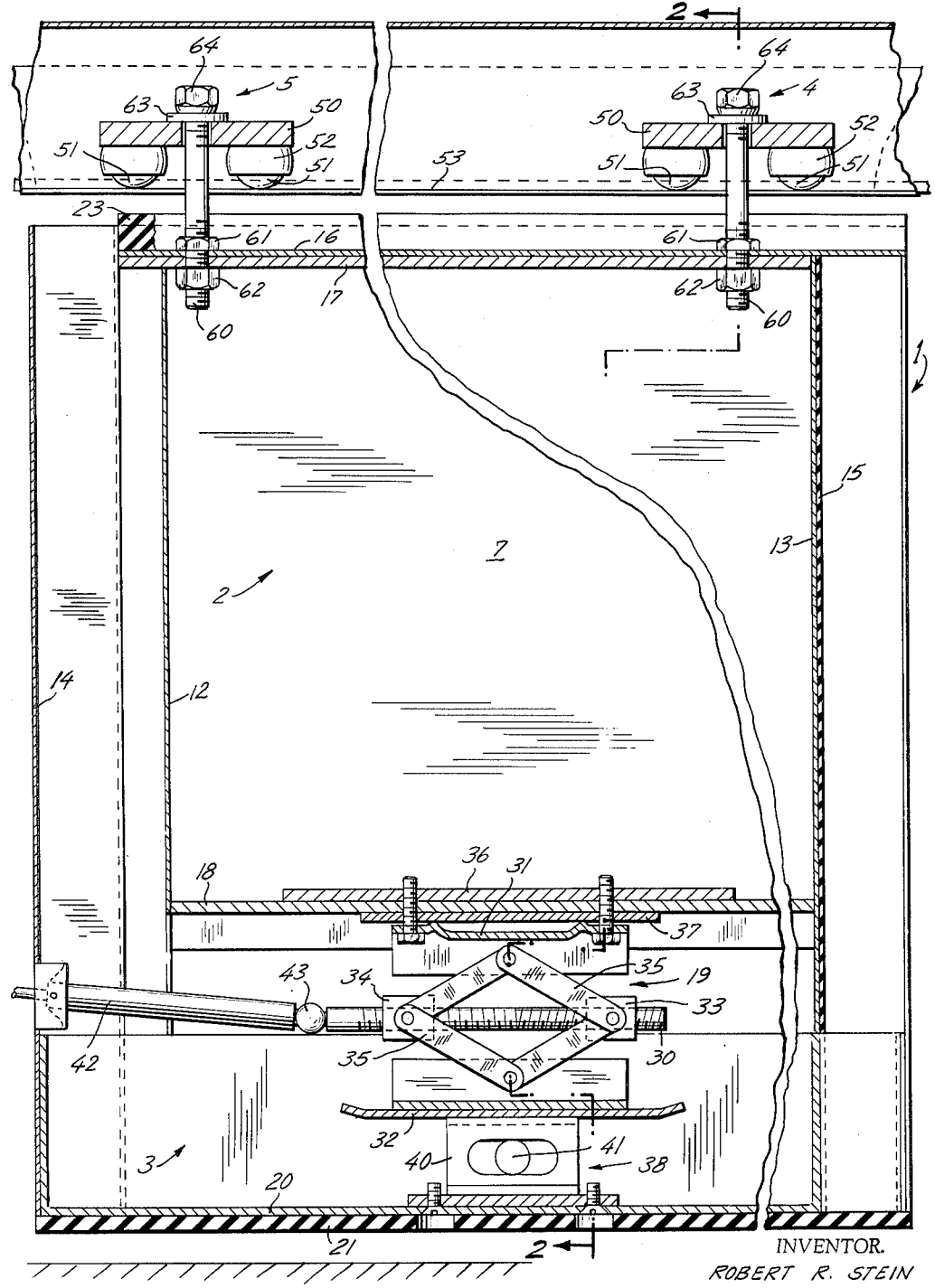
FIG. 1 is a side elevation view of a movable wall panel in the retracted condition supported from an overhead trolley system.
Figure 2:
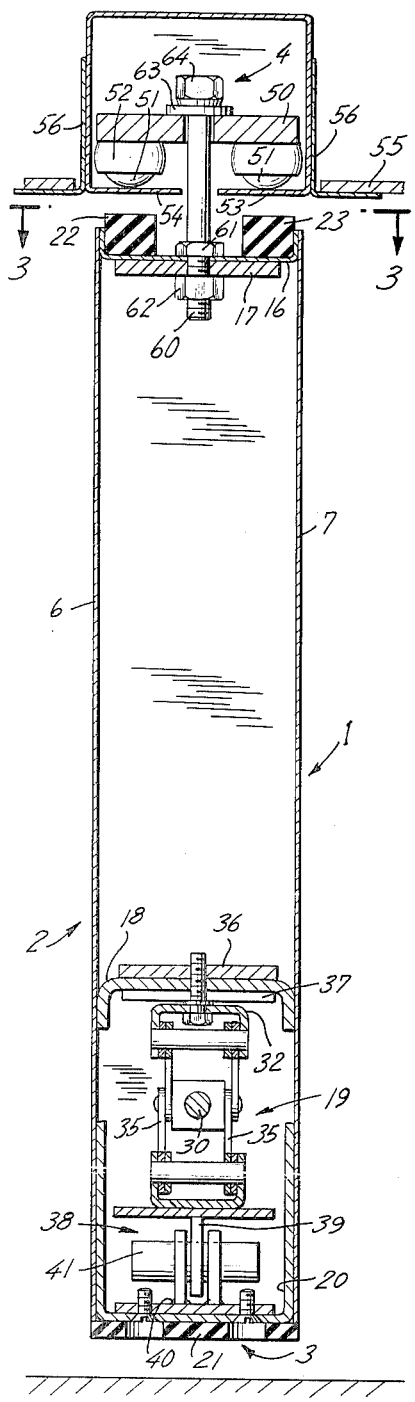
FIG. 2 is a cross sectional view taken along line 2—2 in FIG. 1.

A movable wall panel 1 is shown in FIGS. 1 and 2 in its retracted mobile condition where the wall section is suspended from a pair of overhead trolleys 4 and 5. The wall panel includes a main upper panel portion 2 and a retractable bottom closure member 3.

The wall panel is a welded sheet metal structure including a pair of spaced-apart outer walls 6 and 7 having their vertical edges bent inwardly at right angles to form flanges 8–11. A pair of vertical channel members 12 and 13 (best seen in FIG. 3) are secured between outer walls 6 and 7 near the edges thereof with the flange portions of the channels facing outwardly. The vertical edges of wall panel 1 are designed to provide a tongue and groove engagement with adjacent wall sections. Thus, a male channel-like member 14, constructed from a sheet of perforated material, is secured to the inner surface of flanges 8 and 10 to provide the outwardly extending tongue projection. A female channel-like member 15, which may be constructed from a sheet of perforated material or a sheet of solid material as shown is secured to the inner surfaces of flanges 9 and 11 to provide the vertical groove along the opposite edge of the movable wall panel.

The upper portion of the wall panel is closed by an upper channel member 16 secured between the outer walls 6 and 7 with the flange portions of the channel member extending upwardly and being flush with the upper edges of the outer walls. A rigid load distribution member 17 is secured to the lower surface of channel member 16 and a pair of compressible rubber sealing strips 22 and 23 are secured to the upper surfaces of channel member 16 adjacent the flange portions. A lower horizontal channel member 18 is secured between outer walls 6 and 7 with the flanges thereof extending downwardly. Channel member 18 is positioned a suitable distance above the lower edges of outer walls 6 and 7 so as to provide a recess within panel portion 2 for housing a jack mechanism 19 and bottom closure member 3 when in the retracted position as shown in FIGS. 1 and 2.

Bottom closure member 3 is essentially a channel member 20 with relatively long upwardly extending flanges. The ends of channel member 20 are closed by bending horizontal projections of the channel member upwardly. The bottom closure member structure is completed by securing suitable tongue and groove members to the vertical edges thereof and a rubber sealing strip 21 to the lower surface of channel member 20. The external dimension of bottom closure member 3 conforms to the internal dimension of main wall panel portion 2 so that the bottom closure member can easily be withdrawn within the wall panel.

Jack mechanism 23 is a standard screw operated scissors jack including a generally horizontal threaded screw shaft 30 and a pair of jack platforms 31 and 32 positioned, respectively, above and below the threaded shaft. One-half of screw shaft 30 has a right hand thread and the other half has a left hand thread. A pair of screw followers 33 and 34 are adapted to cooperate with the threads of shaft 30 so that the screw followers move toward and away from one another as the shaft rotates. A combination of eight link members 35 are pivotably connected at their ends, each link member being connected at one end to one of the platforms and at the other end to one of the screw followers. The links are disposed so that they form two vertical rhomboids. The length of the horizontal diagonal of the rhomboid is determined by the distance between the screw followers which in turn determines the length of the vertical diagonal and hence, the distance between platforms 31 and 32.

A pair of rigid load distributing members 36 and 37 are positioned, respectively, above and below channel member 18 and the upper jack platform 31 is secured thereto by means of bolts which are threaded into member 36. The lower jack platform is secured to channel member 20 of the bottom closure member by means of a clevis fitting 38. The clevis fitting includes a male portion 39 secured to jack platform 32 and a female portion 40 secured to channel member 20. A clevis pin 41 passes through suitable apertures located in the legs of the male and female portions of the clevis fitting. Thus, bottom closure member is pivotally secured to the jack mechanism and has some degree of lateral freedom due to the elongated clevis pin aperture in the female portion of the clevis fitting as shown in FIG. 1.

Threaded shaft 30 is coupled to a shaft extension 42 by means of a swivel coupling 43. A free end of the shaft extension is journaled so that it is flush with the inner portion of the vertical groove at the edge of panel portion 2.

The sheet metal shell defined by outer walls 6 and 7 and channel-like members 14 and 15 is filled with a suitable acoustic fibrous material selected for the heat insulating and sound absorbing requirements of the particular installations.

The unique trolley in accordance with this invention includes a circular bearing plate 50 and a plurality of spherical bearing members 51. Each of the bearing members is housed in a bearing retainer 52 which is secured in a suitable aperture in bearing plate 50 by means of a press fit. The bearings and bearing retainers are distributed along a circular path which is concentric with the periphery of the bearing plate. The bearing retaining members each provide a partially open, generally spherical chamber therein which maintains the spherical bearing in position but does not restrict the rotational movement of the bearing member.

The spherical bearing members support the bearing plate upon a suitable overhead track which consists generally of a pair of spaced-apart planar support members 53 and 54. As shown in FIG. 2, the track can be fabricated from a single piece of sheet material shaped so that it has a rectangular configuration being generally closed except for a longitudinal opening in the lower surface thereof. The track can be recessed in a ceiling 55 and secured by suitable brackets 56.

The weight of the movable article, such as a movable wall section, is suspended from the center of the bearing plate. As shown in FIGS. 1 and 2, this can be achieved utilizing a threaded stud 60 passing through an opening in the center of the bearing plate. One end of stud 60 passes through an aperture in channel member 16 and load distributing member 17 and is rigidly secured to the wall panel by means of nuts 61 and 62. A washer 63, having a concave upper surface, is placed above the bearing plate and positioned surrounding stud 60. A nut 64, having a convex lower surface, is threaded on to the free end of stud 60. Thus, the weight is supported from the center of bearing plate 50 via the swivel coupling achieved by means of the concave washer surface and convex nut surface. The swivel connection is desirable since otherwise a relatively small force applied to the lower portion of the wall panel would deform or break the studs. As the wall panel moves upwardly, stud 60 also moves upwardly, so that the wall panel can thereafter easily be positioned.

Figure 9:
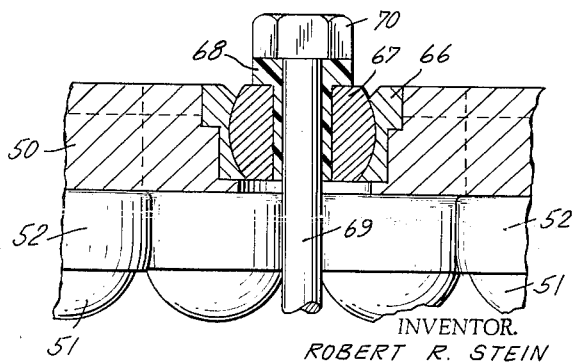
FIG. 9 is a cross sectional view of a trolley illustrating the swivel joint from which the mobile article is suspended.

An alternative swivel coupling is shown in FIG. 9 where the bearing plate is provided with a shouldered aperture passing through the center thereof. A bearing retaining member 66 is seated in the shouldered aperture and provides a generally spherical swivel bearing member 67. A flanged sleeve is positioned in a vertical opening passing through bearing member 67, and a stud 69, which may be the same as studs 60 (FIGS. 1 and 2), passes through the center of sleeve 68. A nut 70 is threaded on to the free end of stud 69 to complete the swivel coupling.

Figure 5:
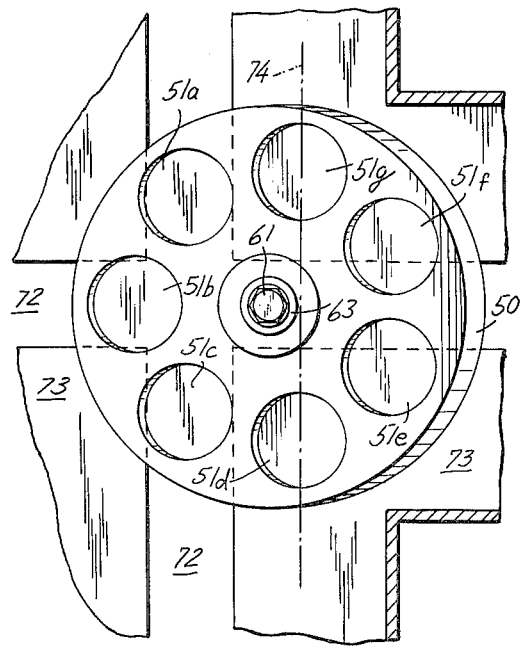
FIGS. 5 and 6 are plan and elevation views, respectively, of a seven ball trolley illustrating the difficulties encountered with respect to cross-shaped track intersections.
Figure 6:
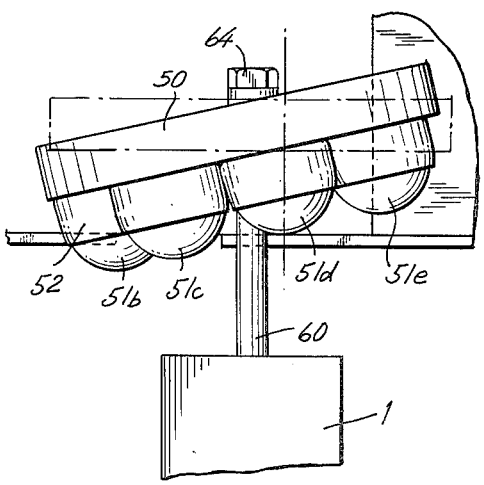
Figure 8:
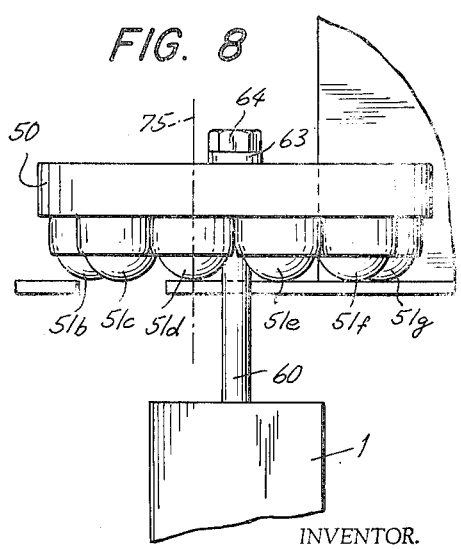
FIGS. 7 and 8 are plan and elevation views respectively illustrating a ten ball trolley with a cross-shaped intersection similar to that shown in FIGS. 5 and 6.
Figure 7:
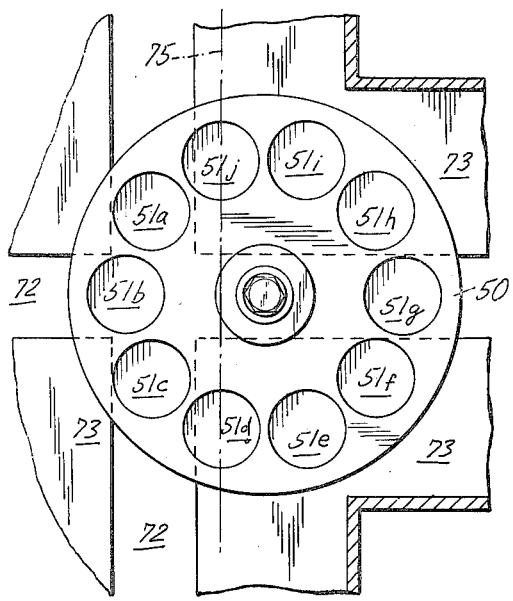

The size of the trolley and the number of spherical bearings included are usually selected in accordance with the load requirements. The trolley may include four bearing members as shown in FIGS. 1 and 2, or may include seven bearing members as shown in FIGS. 5 and 6, or may include ten or more bearing members as illustrated in FIGS. 7 and 8. As shown in FIGS. 5–8, where cross-shaped intersections are employed, there is a definite advantage to trolley structures having nine or more spherical bearing members.

A trolley having seven spherical bearing members, designated consecutively 51a–51g, may reach a position where three of the bearing members, for example, bearing members 51a, 51b and 51c, are directly above the opening 72 between the support members 73 comprising the cross-shaped track intersection. Under these conditions, the weight supported from the center of the bearing plate creates a moment arm which causes the bearing plate to pivot about a center line 74 passing through the center of bearing members 51d and 51g. As a result bearing members 51a–51c drop into opening 72 as shown in FIG. 6.

This condition cannot occur if the trolley includes nine or more spherical bearing members. For example, taking a ten ball trolley as shown in FIGS. 7 and 8 where the ten bearing members are designated consecutively 51a–51j, it is possible for three of the spherical bearing members 51a–51c to be positioned directly above cross-shaped opening 72 at the track intersection. If the bearing plate were to pivot, it would pivot about a center line 75 passing through the centers of bearing members 51d and 51j. It should be noted that in this case the moment arm created by the center supported weight opposes the pivoting motion which would cause bearing members 51a–51c to drop into opening 72. Thus, the bearing plate remains level even when passing over a cross-shaped intersection.

The manner in which a movable weight, such as a movable wall panel 1 suspended from a pair of trolleys 80 and 81, negotiates a right angle turn is illustrated in FIG. 10. The intersection includes a track 82 including spaced-apart support members 83 and 84 and a track 85 disposed at right angles thereto and including spaced-apart support members 86 and 87. Initially, both trolleys are on track 82 with the wall panel moving toward the right (as viewed in FIG. 10). When the lead trolley 80 is centered over the track intersection, the wall panel is guided so that trolley 80 begins to move along track 85 to the position shown in solid lines. Thereafter, the wall panel is guided moving trolley 80 along track 85 away from the intersection to positions 80a and 80b, while trolley 81 moves toward the intersection along track 82 to corresponding positions 81a and 81b as indicated. Finally, when trolley 81 is centered over the intersection it is guided in the direction of track 85 to thereby complete the turn. The trolley system negotiates other types of intersections such as T-shaped, Y-shaped and L-shaped intersections, in similar fashion.

The manner in which the wall panels are placed in their proper positions is illustrated in FIG. 4 with respect to wall panels 90, 91 and 92. Panel 90 is in its retracted condition suspended from a pair of overhead trolleys. In this condition the wall panel is guided along the overhead track to a desired position adjacent other wall panels such as 91 and 92. When a wall panel, such as panel 91, is positioned adjacent a previously installed wall panel, the operator actuates jack mechanism 19 by means of a suitable crank coupled to shaft extension 42. While operating the jack mechanism, the operator applies pressure to the lower portion of the panel urging the panel toward adjacent wall panel 92 to thereby assure proper abutting engagement. Bottom closure member 3 moves downwardly as indicated by arrow 93 to engage the floor 94. It should be noted that due to the pivotable coupling between bottom closure member 3 and jack mechanism 19, the bottom closure member will properly engage the floor even though it may not be parallel to the ceiling.

After the bottom closure member has engaged the floor, further operation of the jack mechanism causes upper panel portion 2 to rise. It should be noted that jack mechanism 19 is located off center and is nearest the edge of the wall panel away from adjacent panel 92. Thus, as the jack mechanism is operated to raise wall panel portion 2, the panel tilts toward adjacent panel 92 as indicated by arrow 95 to thereby assure a proper abutting engagement between the panels in the upper regions. As the wall panel rises, studs 60 travel upwardly through the centers of their respective trolleys so that the weight of the wall panel is no longer supported by the trolley. As a result, the trolley friction which tends to impede movement when the trolley supports the weight of the wall panel is no longer present, and hence, there is no significant force tending to impede the tilting motion. Wall panel 92 is shown in the installed position with the wall panel engaging both the floor and the ceiling.

As previously mentioned, the wall panel is filled with fibrous material and thus provides excellent acoustic insulation. Rubber sealing strips 21 and 23 secured to respectively to the bottom and top of the wall panel provide an acoustic seal which prevents the flow of acoustic energy either above or below the wall panel. The tongue and groove fitting between adjacent panels (best seen in FIG. 3) provides a labyrinth path which restricts the flow of acoustic energy between adjacent panels.

Figure 3:
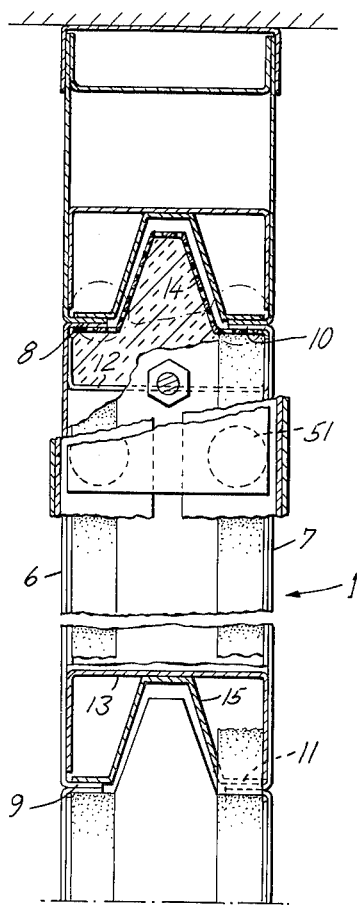
FIG. 3 is a plan view with portions broken away viewing the movable panel from line 3—3 in FIG. 2.

Also, it is significant that at least one of members 14 and 15 is perforated and backed by fibrous acoustic energy absorbing material. In FIG. 3, member 14 is shown as a perforated member backed by fibrous material whereas member 15 is shown as a solid member. As an alternative, the female member 15 could be the perforated member backed by fibrous material instead of member 14, or, where desired, both members can be perforated. The fact that the labyrinth path between panels is lined by a perforated wall backed by acoustic energy absorbing material tends to further attenuate any acoustic energy attempting to pass between the panels. This arrangement has obvious advantages over the prior structure which include fibrous material between the panels.

While only a few embodiments of the invention have been illustrated in detail, it should be obvious to those skilled in the art that there are numerous other embodiments within the scope of this invention. The invention is more particularly defined in the appended claims.

What is claimed is:
1. In a movable wall system, the combination of a horizontal ceiling track including parallel, spaced-apart, planar support members;
   a well panel
       having a vertical dimension less than the distance between said ceiling track and the floor below when said wall section is in a retracted condition, and including means for extending said wall panel so that the same engages said ceiling track and the floor below; and
   a pair of trolleys for supporting said wall panel spaced above the floor when said wall panel is in said retracted condition;
   each of said trolleys comprising
       a bearing plate,
       means for suspending said wall panel from said bearing plate, and
       at least nine spherical bearing members equally spaced-apart about a circular path centered around said means for suspending said wall section and adapted to movably support said bearing plate upon said spaced apart support members.

2. In a trolley system adapted to operate with a ceiling track including T and cross intersections, the combination of
   a horizontal overhead track including parallel, spaced-apart, planar support members;
   a bearing plate;
   means pivotably connected to the center of said bearplate and passing between said support members for suspending a movable weight; and
   at least nine spherical bearings equally spaced-apart around a cicular path surrounding said means for suspending said movable weight;
   said bearing members being disposed to movably support said bearing plate upon said spaced apart support members, and to maintain all of said bearing members in a plane above said support members when straddling one of said intersections.

3. In a trolley system adapted to operate with an overhead track including a T intersection, the combination of
   a horizontal overhead track including parallel, spaced-apart, planar support members;
   a bearing plate;
   means pivotably connected to the center of said bearing plate and passing between said support members for suspending a movable weight; and
   at least seven spherical bearings equally spaced-apart about a circular path surrounding said means for suspending said movable weight;
   said bearing members being disposed to movably support said bearing plate upon said spaced-apart support members and to maintain all of said bearing members in a plane above said support members when straddling said T intersection.

4. In a movable wall system, a combination of a horizontal ceiling track including parallel, spaced-apart, planar support members;
    a wall panel
        having a vertical dimension less than the distance between said ceiling track and the floor below when said wall section is in a retracted condition, and
        including means for extending said wall panel so that the same engages said ceiling track and the floor below; and
    a pair of trolleys for supporting said wall panel spaced above the floor when said wall panel is in said retracted condition;
    each of said trolleys comprising
        a bearing plate,
        means for suspending said wall panel from said bearing plate, and
        at least seven spherical bearing members equally spaced-apart about a circular path surrounding said means for suspending said wall section and adapted to movably support said bearing plate upon said spaced-apart support members.

References Cited by the Examiner

UNITED STATES PATENTS

| | | | |
|---|---|---|---|
| 1,443,382 | 1/1923 | Rapier | 104—98 |
| 1,729,954 | 10/1929 | Lute et al. | |
| 1,803,172 | 4/1931 | Clayton | 104—109 |
| 2,146,289 | 2/1939 | Doyle | 105—153 |
| 2,184,860 | 12/1939 | Barrett | 105—155 |
| 2,350,513 | 6/1944 | Leadbetter | 20—35 X |
| 2,922,202 | 1/1960 | Kodaras | 20—16 |
| 2,982,380 | 5/1961 | Rose | 189—34 |
| 3,072,975 | 1/1963 | Burmeister | 20—19 |
| 3,095,174 | 6/1963 | Dehn et al. | 104—111 X |

FOREIGN PATENTS

| | | |
|---|---|---|
| 932,478 | 9/1955 | Germany. |
| 269,371 | 10/1950 | Switzerland. |

EUGENE G. BOTZ, *Primary Examiner.*

ARTHUR L. LA POINT, *Examiner.*

F. W. MONAGHAN, *Assistant Examiner.*